United States Patent [19]

Moberly

[11] 3,882,092

[45] May 6, 1975

[54] ARYLENE SULFIDE POLYMERS

[75] Inventor: Charles W. Moberly, Bartlesville, Okla.

[73] Assignee: Phillips Petroleum Company, Bartlesville, Okla.

[22] Filed: Nov. 19, 1973

[21] Appl. No.: 416,822

[52] U.S. Cl. ................................ 260/79.1; 260/79
[51] Int. Cl. ........................................ C08g 23/00
[58] Field of Search ........................... 260/79, 79.1

[56] References Cited
UNITED STATES PATENTS 3,354,129  11/1967  Edmonds, Jr. ....................... 260/79

*Primary Examiner*—Melvyn I. Marquis

[57] ABSTRACT

A method of producing arylene sulfide polymers employing (1) polyhalo-substituted aromatic compounds; (2) thiocarbamates, as hereinafter defined; (3) bases selected from the hydroxides of lithium, sodium, potassium, rubidium, cesium, magnesium, calcium, strontium and barium and the carbonates of sodium, potassium, rubidium and cesium; and, (4) organic amides.

20 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one thiocarbamate, at least one base selected from the hydroxides of lithium, sodium, potassium, rubidium, cesium, magnesium, calcium, strontium and barium, and the carbonates of sodium, potassium, rubidium and cesium and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Thiocarbamates which are preferred for use in the process of this invention can be represented by the formula

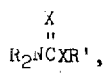

wherein each R is selected from hydrogen and R'', R' is selected from alkali metals and R'', R'' is a monovalent hydrocarbyl radical selected from alkyl, cycloalkyl, and aryl, and combinations thereof such as alkaryl, aralkyl, and the like, the number of carbon atoms in said hydrocarbyl radical being within the range of 1 to about 12, and each X is selected from oxygen and sulfur, at least one X being sulfur.

Examples of some thiocarbamates which can be used include lithium thiocarbamate, methyl butyldithiocarbamate, sodium dimethyldithiocarbamate, sodium ethyldithiocarbamate, S-ethyl propylthiocarbamate, O-isopropyl butylthiocarbamate, butyl methylethyldithiocarbamate, hexyl diphenyldithiocarbamate, potassium p-tolylthiocarbamate, 2-ethylhexyl dibenzyldithiocarbamate, S-decyl dicyclohexylthiocarbamate, dodecyl didodecyldithiocarbamate, O-cyclohexyl dihexylthiocarbamate, rubidium (3-ethylpentyl)dithiocarbamate, S-phenyl didecylthiocarbamate, cyclopentylmethyl (cyclopentylmethyl)dithiocarbamate, cesium (3-methylcyclopentyl)thiocarbamate, 4-methylcyclohexyl octyldithiocarbamate, O-benzyl propylisobutylthiocarbamate, m-tolyl disopropyldithiocarbamate, and the like, and mixtures thereof.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the thiocarbamate, the base and the organic amide or which can be present in a composite formed from the thiocarbamate, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the thiocarbamate, the base and the organic amide is maintained at polymerization conditions to produce the arylene sulfide polymer.

The ratio of reactants can vary considerably but about 0.9 to about 2, and preferably about 0.95 to about 1.2, gram-moles of the polyhalo-substituted aromatic compound will generally be employed per gram-atom of sulfur in the thiocarbamate. The base generally will be employed in an amount within the range of from about 1 to about 6, and preferably from about 1.2 to about 4, gram-equivalents per gram-atom of sulfur in the thiocarbamate. As used herein, one gram-equivalent of the hydroxides of magnesium, calcium, strontium and barium represents the same amount as one-half gram-mole of these substances, whereas for the hydroxides of lithium, sodium, potassium, rubidium, and cesium, or for the carbonates of sodium, potassium, rubidium, and cesium, the amount represented by one gram-equivalent is considered to be the same as that represented by one gram-mole.

The amount of organic amide employed can also vary over a wide range but will generally be within the range of from about 100 grams to about 2500 grams per gram-mole of polyhalo-substituted aromatic compound employed.

The temperature at which the polymerization can be conducted can vary over a wide range. Generally, temperatures within the range of from about 125°C. to about 450°C. and preferably within the range of from about 175°C. to about 350°C. will be employed. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein. The reaction can be carried out under aqueous or anhydrous conditions.

The arylene sulfide polymers produced by the method of this invention can be separated from the reaction mixture by conventional procedures, for example, by filtration of the polymer followed by washing with water, or by dilution of the reaction mixture with water, followed by filtration and water-washing of the polymer.

The arylene sulfide polymers prepared by the process of this invention can be blended with fillers, pigments, extenders other polymers and the like. They can be cured through crosslinking and/or chain extension, for example, by heating at temperatures up to about 480°C. in the presence of a free oxygen-containing gas, to provide cured products having high thermal stability and good chemical resistance. They are useful in the production of coatings, films, molded objects and fibers.

The previous statements are based upon the following examples.

In these examples, the crystalline melting point, (Tm) was determined by differential thermal analysis. Values for inherent viscosity were determined at 206°C. in 1-chloronaphthalene at a polymer concentration of 0.4 g/100 ml solution. Yields were calculated on the basis of a theoretical yield at 108 grams of polymer per gram-atom of sulfur in the thiocarbamate employed.

EXAMPLES

Polymerization reactions were conducted in a one-liter reactor constructed of stainless steel. In each instance, the reactor was charged with 275 grams of N-methyl-2-pyrrolidone, and the thiocarbamate and sodium hydroxide in the amounts indicated. Dehydration was conducted by heating to 196°C. and collecting the distillate comprising water and N-methyl-2-pyrrolidone.

After dehydration, 1,4-dichlorobenzene, in the amount indicated, dissolved by warming with 52 grams N-methyl-2-pyrrolidone, was added to the reactor. The reactor was heated to 246°C. and maintained at this temperature for 3 hours.

The reactor was cooled to about 66°C. and the poly(p-phenylene sulfide) products were removed and washed four times with hot water.

The product formed employing sodium dimethyldithiocarbamate was also washed once with methanol preceding the water washes.

The products were dried at 100°C. in a vacuum oven for about 16 hours using a nitrogen sweep. Infrared spectra of the dried products showed them to have absorptions characteristic of poly(p-phenylene sulfide) with only minor additional absorptions.

Data were as follows:

Run I

| Components Charged | | |
|---|---|---|
| Sodium dimethyldithiocarbamate | 0.35 | gram-mole |
| Sodium hydroxide | 1.05 | gram-moles |
| 1,4-Dichlorobenzene | 0.72 | gram-mole |

Run I-Continued

| | | |
|---|---|---|
| N-Methyl-2-pyrrolidone | 327 | grams |
| Poly(p-phenylene sulfide) Product | | |
| Yield, % | 56 | |
| Inherent viscosity | 0.04 | |
| Ash, weight % | 0.73 | |
| Tm, °C. | 277 | |

Run II

| Components Charged | | |
|---|---|---|
| Sodium ethyldithiocarbamate dihydrate | 0.117 | gram-mole |
| Sodium hydroxide | 0.35 | gram-mole |
| 1,4-Dichlorobenzene | 0.242 | gram-mole |
| N-Methyl-2-pyrrolidone | 327 | grams |
| Poly(p-phenylene sulfide) Product | | |
| Yield, % | 45 | |
| Inherent viscosity | 0.01 | |

It will be evident from the foregoing that various modifications can be made to the method of this invention. Such are considered, however, to be within the scope thereof.

What is claimed is:

1. A method of producing a polymer which comprises:

a. contacting at least one polyhalo-substituted aromatic compound wherein the halogen atoms are attached to aromatic ring carbon atoms, at least one base selected from the hydroxides of lithium, sodium, potassium, rubidium, cesium, magnesium, calcium, strontium and barium and the carbonates of sodium, potassium, rubidium and cesium, at least one organic amide and at least one thiocarbamate having the formula $$R_2N-\overset{X}{\underset{\|}{C}}-XR'$$

wherein each R is selected from hydrogen and R", R' is selected from alkali metals and R", and R" is a monovalent hydrocarbyl radical selected from alkyl, cycloalkyl and aryl, and combinations of said radicals, the number of carbon atoms in said hydrocarbyl radical being within the range of 1 to about 12, and each X is selected from oxygen and sulfur, at least one X being sulfur, to form a composition; and, b. maintaining at least a portion of said composition at polymerization conditions to produce said polymer.

2. The method of claim 1 in which said composition is formed employing about 0.9 to about 2 gram-moles of polyhalo-substituted aromatic compound per gram-atom of sulfur in said thiocarbamate.

3. The method of claim 1 in which said composition is formed employing about 1 to about 6 gram-equivalents of base per gram-atom of sulfur in said thiocarbamate.

4. The method of claim 1 in which said organic amide is employed in an amount within the range of from about 100 grams to about 2500 grams per gram-mole of polyhalo-substituted aromatic compound.

5. The method of claim 1 in which said thiocarbamate is selected from the group consisting of lithium thiocarbamate, methyl butyldithiocarbamate, sodium dimethyldithiocarbamate, sodium ethyldithiocarbamate, S-ethyl propylthiocarbamate, O-isopropyl butylthiocarbamate, butyl methylethyldithiocarbamate, hexyl diphenyldithiocarbamate, potassium p-tolylthiocarbamate, 2-ethylhexyl dibenzyldithiocarbamate, S-decyl dicyclohexylthiocarbamate, dodecyl didodecylthiocarbamate, O-cyclohexyl dihexylthiocarbamate, rubidium (3-ethylpentyl)dithiocarbamate, S-phenyl didecylthiocarbamate, cyclopentylmethyl (cyclopentylmethyl)dithiocarbamate, cesium (3-methylcyclopentyl)thiocarbamate, 4-methylcyclohexyl octyldithiocarbamate, O-benzyl propylisobutylthiocarbamate, m-tolyl diisopropyldithiocarbamate, and the like, and mixtures thereof.

6. The method of claim 1 in which said thiocarbamate is sodium dimethyldithiocarbamate.

7. The method of claim 1 in which said thiocarbamate is sodium ethyldithiocarbamate.

8. The method of claim 6 in which said polyhalo-substituted aromatic compound is 1,4-dichlorobenzene, said base is sodium hydroxide, and said organic amide is N-methyl-2-pyrrolidone.

9. The method of claim 7 in which said polyhalo-substituted aromatic compound is 1,4-dichlorobenzene, said base is sodium hydroxide and said organic amide is N-methyl-2-pyrrolidone.

10. The method of claim 1 in which water is removed from said composition prior to step (b).

11. A method of producing a polymer which comprises:
a. contacting at least one base selected from the hydroxides of lithium, sodium, potassium, rubidium, cesium, magnesium, calcium, strontium, and barium and the carbonates of sodium, potassium, rubidium and cesium, at least one organic amide and at least one thiocarbamate having the formula

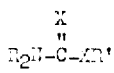

wherein each R is selected from hydrogen and R'', R' is selected from alkali metals and R'', and R'' is a monovalent hydrocarbyl radical selected from alkyl, cycloalkyl and aryl, and combinations of said radicals, the number of carbon atoms in said hydrocarbyl radical being within the range of 1 to about 12, and each X is selected from oxygen and sulfur, at least one X being sulfur, to form a first composition;
b. contacting at least a portion of said first composition with at least one polyhalo-substituted aromatic compound wherein the halogen atoms are attached to aromatic ring carbon atoms to form a second composition; and,
c. maintaining at least a portion of said second composition at polymerization conditions to produce said polymer.

12. The method of claim 11 in which said second composition is formed employing about 0.9 to about 2 gram-moles of polyhalo-substituted aromatic compound per gram-atom of sulfur in said thiocarbamate.

13. The method of claim 11 in which said first composition is formed employing about 1 to about 6 gram-equivalents of base per gram-atom of sulfur in said thiocarbamate.

14. The method of claim 11 in which said organic amide is employed in an amount within the range of from about 100 grams to about 2500 grams per gram-mole of polyhalo-substituted aromatic compound.

15. The method of claim 11 in which said thiocarbamate is selected from the group consisting of lithium thiocarbamate, methyl butyldithiocarbamate, sodium dimethyldithiocarbamate, sodium ethyldithiocarbamate, S-ethyl propylthiocarbamate, O-isopropyl butylthiocarbamate, butyl methylethyldithiocarbamate, hexyl diphenyldithiocarbamate, potassium p-tolythiocarbamate, 2-ethylhexyl dibenzyldithiocarbamate, S-decyl dicyclohexylthiocarbamate, dodecyl didodecylthiocarbamate, O-cyclohexyl dihexylthiocarbamate, rubidium (3-ethylpentyl)dithiocarbamate, S-phenyl didecylthiocarbamate, cyclopentylmethyl (cyclopentylmethyl)dithiocarbamate, cesium (3-methylcyclopentyl)thiocarbamate, 4-methylcyclohexyl octyldithiocarbamate, O-benzyl propylisobutylthiocarbamate, m-tolyl diisopropyldithiocarbamate, and the like, and mixtures thereof.

16. The method of claim 11 in which said thiocarbamate is sodium dimethyldithiocarbamate.

17. The method of claim 11 in which said thiocarbamate is sodium ethyldithiocarbamate.

18. The method of claim 16 in which said polyhalo-substituted aromatic compound is 1,4-dichlorobenzene, said base is sodium hydroxide, and said organic amide is N-methyl-2-pyrrolidone.

19. The method of claim 17 in which said polyhalo-substituted aromatic compound is 1,4-dichlorobenzene, said base is sodium hydroxide and said organic amide is N-methyl-2-pyrrolidone.

20. The method of claim 11 in which water is removed from said first composition.

* * * * *